United States Patent [19]

Nichols

[11] Patent Number: 4,701,847

[45] Date of Patent: Oct. 20, 1987

[54] ADAPTIVE INSTRUCTION SEQUENCE SYNTHESIZER AND PROCESS

[75] Inventor: John L. Nichols, Santa Clara, Calif.

[73] Assignee: Logical Services, Inc., Santa Clara, Calif.

[21] Appl. No.: 689,836

[22] Filed: Jan. 9, 1985

[51] Int. Cl.$^4$ .............................................. G06F 9/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,215,399 | 7/1980 | Pavioic et al. | 364/200 |
| 4,377,844 | 3/1983 | Kaufman | 364/200 |
| 4,438,492 | 3/1984 | Harmon et al. | 364/900 |
| 4,498,136 | 2/1985 | Sproul | 364/200 |
| 4,553,201 | 11/1985 | Pollack | 364/200 |

OTHER PUBLICATIONS

Nichols, "Discrete I/O for uCOM-8", 1975, NEC Microcomputers, Inc.
Nichols, "Hardware Versus Software for Microprocessor I/O", Computer Design, Aug. 1976.
Don Lancaster, "Build the TVT-6: A Low-Cost Direct Video Display", Popular Electronics.

Primary Examiner—David Y. Eng
Attorney, Agent, or Firm—Flehr, Hohbach, Test, Albritton & Herbert

[57] ABSTRACT

An apparatus and method for adaptively generating instructions for use by the central processing unit (CPU) of a computer. Upon detection of a start up signal pattern on the computer's system bus, instructions are generated in response to memory access signals from the CPU. The invention performs data processing operations that would otherwise be performed by the CPU, and produces instructions for execution by the CPU based on the results of these data processing operations, thereby reducing the number of instructions executed by the CPU to perform a predefined task.

13 Claims, 7 Drawing Figures

FULL INTERCEPT CONFIGURATION OF SYNTHESIZER IN A GENERALIZED COMPUTER SYSTEM

NON-INTERCEPT CONFIGURATION OF SYNTHESIZER IN A GENERALIZED COMPUTER SYSTEM

BLOCK DIAGRAM OF NON-INTERCEPT SYNTHESIZER

NON-INTERCEPT
DATA BUS
INTERFACE

AISS PROCESS FLOW

ADAPTIVE INSTRUCTION SEQUENCE SYNTHESIZER AND PROCESS

BACKGROUND OF THE INVENTION

1. Field of the Invention

The present invention relates generally to computer and peripheral control devices and processes, and more particularly to such processes and devices capable of adaptively synthesizing a sequence of instructions to be executed by a computer system's central processing unit.

2. Discussion of the Technology and Prior Art

A computer system generally consists of a central processing unit (CPU), memory, and one or more of several peripheral devices, all connected together by means of a data bus, an address bus, and a control bus. The control bus is a collection of control signals used to synchronize the passing of data and addresses between the above listed elements of the computer. At least one of the peripheral devices must perform the necessary Input/Output functions of the computer. Other peripherals may be added to augment I/O capability, or to augment the CPU's processing capability.

The speed at which a computer system can perform data processing operations is determined by two factors: the number of instructions that must be executed in order to perform the desired data processing operation, and the speed at which the computer can execute these instructions. Many techniques have been used in the prior art to augment the speed at which computers can execute instructions. These include higher clock rates, pre-fetching instructions, cache memories, and multiprocessing among others, but they are not of concern in the present discussion. Several techniques are used in the prior art to reduce the number of instructions that must be executed and thereby speed up data processing operations, including the addition to the computer system of peripheral devices. These techniques provide foundation technology for the present invention and are enumerated herein.

Types of Instructions

Instructions that are executed by the computer's CPU can be divided into "working" instructions which directly perform the desired data processing operation, and "overhead" instructions which do not actually perform the intended operation, but merely prepare the CPU for the execution of working instructions. Overhead instructions typically control the order of instruction execution, and select or calculate memory addresses to be used by the next instructions. Overhead instructions for maintaining interation counters to track progress of data processing operations and calculating addresses occupy a significant portion of the execution time of most data processing operations compared to the execution time of the working instructions.

Instruction Sources

With few execptions instructions supplied to a computer's CPU from memory locations containing the program to be executed using addresses provided by a program counter. The instruction contents of these memory locations usually remain fixed during the execution of the program. Certain exceptions to this rule in the prior art provide foundation technology for the present invention.

Changes to Instruction Memory Contents

A technique known as self modifying code was used in early computers having only absolute addressing capability. In order to program loop operations in these computers, it was necessary for the program to modify the address field of some instructions in memory each time the loop was executed. This technique is not prevalent today, as more flexible addressing capability is available in most modern CPU's.

When the program to be executed exceeds the size of the random access memory (RAM) available, it is a common practice to divide the program into segments which can be sequenced into memory at different times. When a particular segment is required, it is loaded from an external mass memory device such as a magnetic disk memory. As a result, some locations in the area of RAM where the program is stored change from time to time during the execution of such a program.

In both of these techniques the contents of the program memory are changed by executing a program, which is a relatively slow process, and does not in itself serve to reduce the number of instructions to be executed in performing data processing operations.

Instruction Sources Other Then Memory

The most common exception to the memory being the source of instructions occurs in the interrupt method used by many computers. In this method, when a peripheral device requests an interrupt, the CPU acknowledges the request by activating a control signal. This signal tells the peripheral device that it is to supply the next instruction for the CPU to execute. The instruction supplied is usually a Call to the routine in memory that will be executed by the CPU to service the interrupt.

A less common exception is the so called "Psuedo-DMA" operation used in I/O operations. During a Psuedo-DMA operation no-operation (NOP) instructions (or other instructions which are effectively no-operation instructions) and jump instructions are supplied to the CPU instead of the contents of the memory locations addressed by the program counter. This causes the program counter to be used as a data pointer, supplying addresses to the memory as required by the Input or Output operation.

Except for cases described above, instructions are typically supplied to the CPU for execution from a memory location, and these memory locations which contain program instructions remain fixed during all processing by the CPU.

Programming Techniques for Instruction Reduction

The field of software design and programming is replete with algorithms and coding tricks for reducing the number of instructions required to perform various data processing operations. Many such algorithms offer significant improvements in speed of execution, but coding tricks often result in program code that is difficult to debug and maintain. Many such software techniques can be used in conjunction with the present invention to achieve even greater increases in speed.

A significant percentage of the data processing operations that are performed by a computer, especially in management programs, require the repeated execution of small sections of code, in the form of loops or nested loops. Often when a CPU is executing these repetitive operations, a significant amount of the execution time is required by the overhead instructions that keep track of the number of times a loop has been executed and calculate the addresses to be used for the next execution of the loop.

A common practice used by programmers to speed the execution of these repetitive operations, is to "unroll" the loops, repeating the code required in memory the required number of times, thus eliminating the loop control instructions. It is seldom possible to completely unroll loops because the resulting code would often consume more memory space than available, and the number of iterations required is seldom known in advance. Faster operation can usually be obtained, however, by partially unrolling the loops.

Data Processing Peripherals

The number of instructions required to perform a desired data processing function in a computer system can be reduced by adding to the system a peripheral device that performs data processing functions in its internal hardware, independent of the CPU. Such special purpose peripheral devices can be divided into pure data processing devices and I/O related data processing devices.

Special purpose peripheral and co-processors are available to perform complex arithmetic operations external to the main CPU. The CPU is required to execute only those instructions necessary to direct the peripheral to perform the desired function. When the peripheral has completed its assigned task, it notifies the CPU by via a status word to be read by CPU, or by providing an interrupt to the CPU. This technique has the advantage that co-processors can be designed to execute special classes of data processing operations such as arithmetic operations much faster than a general purpose CPU. However, such devices are very costly because of their complexity and limited demand for the specialized functions they perform. Furthermore, they usually compete with the CPU for access to the busses, and do not relieve the CPU of executing the overhead instructions required to manage the use of memory. Nor do they assist the CPU to determine the next instructions required during and after the peripheral device has done its work.

Another example is the capability provided by certain Direct Memory Access (DMA) peripheral devices to perform simple memory move or search operations. Very limited capability is available to assist computer systems to perform complex memory search and move operations, although it is these types of operations which are more prevalent and which consume a large amount of the time required to execute many programs.

I/O Related Peripherals

The most common available peripherals that perform data processing operations are related to Input or Output (I/O) devices. I/O peripheral devices with data processing capability are added to a computer system when the computer is not fast enough to perform the data processing in the allowable time, or when CPU time is needed for other concurrent operations.

One example of such I/O related data processing occurs in the Universal Asynchronous Receiver/Transmitter (UART) devices used to accomplish the serial-to-parallel and parallel-to-serial data conversions required to interface computers to other systems via serial data ports. Although most computers execute instructions fast enough to accomplish the required conversions for low serial data rates, UART devices are often used to provide the required conversions together with related functions such as parity, cyclic redundancy checking, and error correction in hardware, freeing CPU time for other functions. However, in most cases, the CPU must still execute the program that performs the data transfers to and from memory.

In some cases, the intervention of such peripheral devices is essential because of the characterisics of the I/O devices to which the CPU is interfaced. Very few existing computer systems can execute instructions fast enough to accommodate I/O with such devices as rigid magnetic disk drives, CRT displays, local area networks and other high-speed devices. In these and other cases, peripheral devices must be added to perform the serial-to-parallel and parallel-to-serial conversions, and to perform the data transfers between the peripheral and the memory. In addition to the peripheral controller device, a separate and relatively expensive DMA device must usually be used to achieve the data transfer speed required.

Unfortunately, such peripheral deivces in the prior art that perform data processing operations provide only a partial reduction in the instructions executed by the CPU and a marginal increase in the speed of executing the desired operations. A great many data processing applications require the computer system to carry out complex memory move and search operations, but so far very few devices have been designed to assist the CPU in the efficient execution of such tasks. Some direct memory access (DMA) devices are avaialble to support relatively simple and straightforward memory move and search assignments, but the usefulness of such devices tends to be reduced by their relatively limited ability to handle complex tasks and by their high cost relative to the cost of the rest of the components in the computer system in which they are implemented. Such devices require numerous instructions to be executed by the CPU which could be eliminatd by use of the present invention.

Peripheral Interfacing

Peripherals may be interfaced to a computer via I/O ports (locations addressed by I/O instructions) or they may be interfaced as memory locations. When peripherals are placed in I/O locations, I/O instructions must be used for the transfer of information between the computer and the peripheral. Many computers do not have I/O instructions and thus all peripherals must appear to the computer as memory locations. Even when a computer has I/O instructions, the peripheral may be mapped into memory space in order to use memory access instructions to communicate with the peripheral, because such instructions in most computers are more powerful than the I/O instructions. Peripherals interfaced via memory locations are spoken of as memory mapped.

Control of peripherals by the CPU

In all operations that are performed by a computer with the assistance of a peripheral, action is divided between the CPU and the peripheral. The more complex the peripheral, the less the CPU is required to participate in the operations. Most commonly, the CPU directs the operation of a peripheral by the execution of instructions that write commands and parameters to the peripheral. In some complex peripherals this may consist of simply supplying a memory address to the peripheral. The peripheral may then use DMA operations to fetch and execute the instructions starting at the indicated address in memory. The peripheral then performs the operations directed by these instructions without any further interchange with the CPU until its assigned task is completed.

Control of the CPU by the Peripheral

In all known cases the peripheral must be able to call for and direct the CPU's participation when the peripheral requires it. Therefore, the peripheral must have some control over the operation of the computer. Common methods that are used to provide such control include:

(1) a status word which the computer can read and test to determine the instruction sequence the peripheral requires the CPU to execute next (requires the CPU to execute overhead instructions to read and decode the status word), (2) a wait signal to the CPU which stops the CPU from completing a data transfer until the peripheral is ready to provide or receive data, (3) an interrupt signal to the CPU that forces the computer to save its place in the program that it is presently executing and start executing a program that the peripheral requires, (4) activation of a DMA request signal to the CPU which causes the CPU to suspend execution of instructions and allow the peripheral to take control of the address bus, the data bus, and the necessary control signals, and to directly access the memory.

Data exchange between the computer and the peripheral

Most I/O peripherals provide an address where the computer may write output data to the peripheral or read input data from the peripheral. In a significant percentage of I/O operations, data is transferred between the peripheral and a block of memory locations. As a result, in most computers, the data must appear on the computer's data bus twice, once during transfer between the peripheral and a data register, and second, between the data register and the memory. In the case of DMA operations the data register may be in the DMA device rather than the CPU. This double transfer wastes a considerable amount computer execution time.

The present invention relates to a new process that significantly reduces the number of instructions that must be executed by the CPU in order to perform a variety of common data processing operations with only a small increase in hardware cost. This is accomplished by eliminating most of the overhead instructions from the instruction stream executed by the CPU, and accomplishing these overhead functions concurrently in the hardware of a peripheral device. This new process can be implemented in the design of a peripheral device, which can be easily added to an existing computer system, or the process can be included in the design of any one of the elemetns of a computer system.

OBJECTS OF THE PRESENT INVENTION

The primary objective of the present invention is to provide a low-cost method of and apparatus for increasing the speed at which a computer system can perform a variety of common data processing operations, including those required in conjunction with input/ouput operations. The present invention uses a method whereby the instruction stream to be executed by the computers's CPU in many common data processing operations is adaptively synthesized by a peripheral device as a function of sequence control and data processing operations performed internal to the peripheral device and concurrently with execution of instructions by the CPU.

The ability of this invention to increase the speed of execution by a computer of common data processing tasks at a small additional hardware cost is derived from the fact that a significant percentage of the functions heretofore performed by a CPU executing short sequences of instructions can be performed using the present invention by very simple hardware in the peripheral device operating concurrently with, and much more rapidly than, the execution of instructions by the CPU. Although each function provided by the peripheral device eliminates only a few instructions, the instructions eliminated are those heretofore executed often and repeatedly by the CPU, thus occupying a large proportion of execution time.

The logic functions provided in the peripheral device can perform all the instruction stream sequencing controls, augment the CPU's data address calculation and selection capability, and perform many simple functions that contribute directly to the intended data processing operation.

The sequence of instructions supplied to the CPU by the peripheral device is selected as a function of the concurrent data processing operations performed internal to the peripheral device. The symbiotic relationship arising between the CPU and the peripheral device leads to increased speed of execution of data processing operations by the computer.

The process of the present invention requires that a peripheral device be attached to the computer's buses embodying in its design the sequential and combinatorial logic functions required to encompass a particular range of data processing operations. The detailed design and operation of such peripheral deivces may vary widely depending on the operations selected to be implemented and the instruction set of a particular CPU.

The essential design requirements for such peripheral devices and two preferred embodiments for configuring their interconnection to the computer system are illustrated by the drawings and descriptions herein. In the "Full Intercept" embodiment, the peripheral device is positioned between the CPU and the memory and I/O sections of the computer system with the data and control buses routed though the peripheral device. The "Non-intercept" embodiment configures the peripheral device in parallel with the memory and I/O sections of the computer system. Detailed implementations of these preferred embodiments in the form of integrated circuit devices, printed circuit boards, and enhancements to present devices will no doubt become apparent to those skilled in the art after having read the detailed descriptions of preferred embodiments contained herein.

Briefly, the present invention relates to a process by which the computer's CPU is provided with an adaptively synthesized stream of instructions to execute; and an apparatus comprised of a memory-mapped peripheral device which synthesizes the instruction stream as a function of data processing operations and cominatorial logic internal to the peripheral, wherein the processing operations that are performed internal to the peripheral in order to synthesize the instruction stream are selected and defined by parameters provided to the peripheral by the CPU.

Advantages

It is an advantage of the present invention that it provides a process and apparatus which can be implemented at a low cost and can significantly increase the speed at which a computer system can perform a wide variety of common repetitive data processing operations.

It is a further advantage of the present invention that the process eliminates all of the sequence control instructions and many data address selection and calculation instructions, as well as instructions that contribute directly to the intended data processing operation from the instruction stream heretofore executed by the CPU to perform a variety of data processing functions.

It is a further advantage of the present invention that when the process is used to speed data processing required in conjunction with any kind of High Speed I/O operation, the resulting increase in processing speed allows more of the I/O function to be performed by the CPU's execution of instructions, so that the complexity (and therefore the cost) of the peripheral hardware required to accomplish such an operation can in many cases be significantly reduced.

It is a further advantage of the present invention that in a computer system composed of modules that are connected to an interconnecting bus, the process of this invention can be implemented as an enhancement to any of the types of modules that are commonly used in such a computer.

It is a further advantage of the present invention that the process can be implemented in the design of modular additions to many existing computer systems that accept plug-in modules into the bus structure of the computers. As a result, a large percentage of existing computers can be enhanced by the addition to the computer system of a module designed to provide the benefits of this invention to those types of computer systems.

It is a further advantage of the present invention that when an existing computer system is enhanced by the addition of a module that implements the process, the enhancement will not interfere with the computer's execution of programs the computer executed before it was so enhanced.

These and other objects and advantages of the present invention will no doubt become apparent to those skilled in the art after having read the following detailed descriptions of preferred embodiments which are contained in and illustrated by the various drawing figures.

IN THE DRAWINGS

DESCRIPTION OF THE PREFERRED EMBODIMENTS

Figure 1:
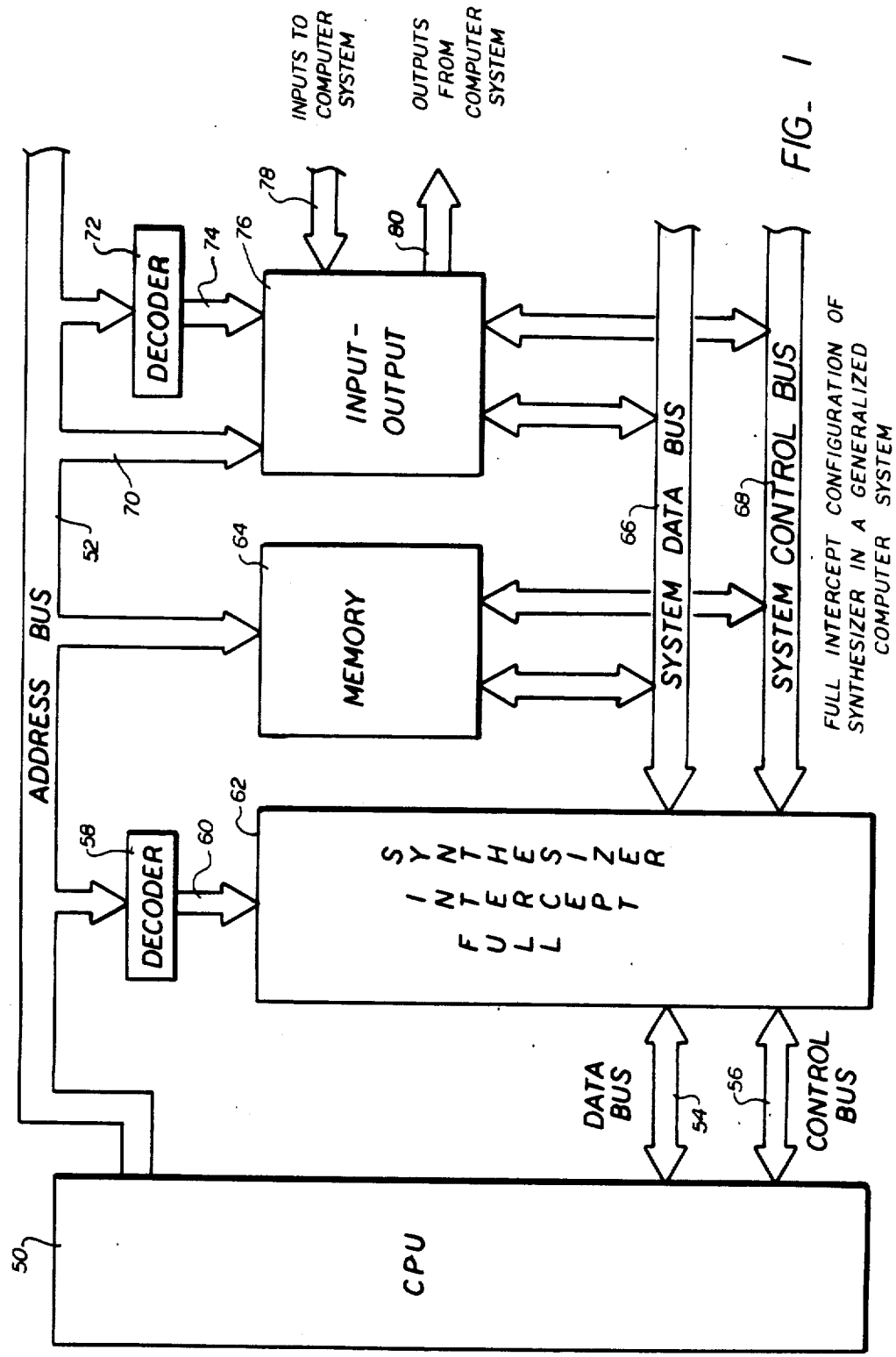
FIG. 1 is a block diagram of a generalized computer system showing the synthesizer in a full intercept configuration.
Figure 2:
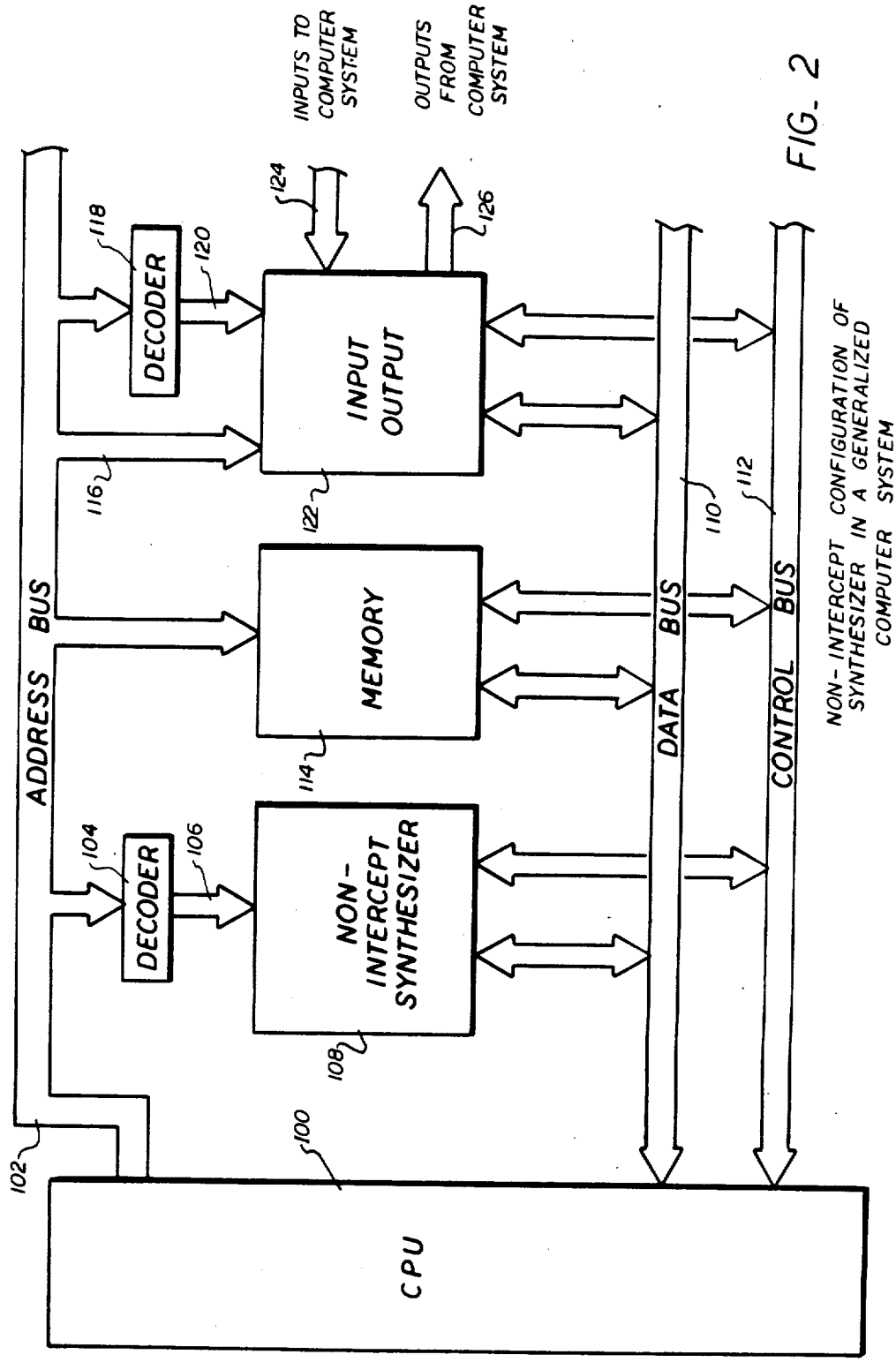
FIG. 2 is a block diagram of a generalized computer system showing the synthesizer in a non-intercept configuration.

Before a detailed description of the Adaptive Instruction Sequence Synthesis (AISS) process and the preferred embodiments of this invention are undertaken, it is necessary to discuss a generalized computer system having a synthesizer peripheral apparatus embodying the present invention attached to the computer system in each of two primary configurations shown in FIG. 1 and FIG. 2. The full intercept configuration is the more complex and the broader of the two configurations and is described first. The non-intercept configuration is subsequently described.

Full Intercept Configuration of Synthesizer

FIG. 1 shows the full intercept configuration of the synthesizer peripheral apparatus in a computer system. The computer system's Central Processing Unit (CPU) 50 is connected to a synthesizer 62, which comprises a preferred embodiment of the present invention, by means of a data bus 54, a control bus 56, and an address decoder 58 connected to the address bus 52. Decoders 58 and 72 decode the address bus 52 and provide decoded signals 60 to the synthesizer 62 and decoded signals 74 to Input-Output (I/O) devices 76. The address bus 52 connects directly to the memory 64 and, in some cases, selected address bus signals 70 are connected directly to I/O devices. The synthesizer 62 is in turn connected to some or all of the computer system's memory 64 and one or more I/O devices 76 by means of two bus structures: a system data bus 66 and a system control bus 68. All of said buses and decoder logic are well known in the prior art and comprise the standard and accepted methodology for providing means of interface between a CPU and the component parts of the computer system located outside the CPU.

The major advantage of the full intercept configuration is a significant increase in the speed of data processing operations over the non-intercept configuration because the synthesizer can control the data bus 54 and the control bus 56, while independently controlling the system data bus 66 and the system control bus 68. The synthesizer can therefore read and write the contents of the memory 64 selected by the CPU's program counter while the synthesizer 62 is supplying an instruction for the CPU 50 to execute. A significant speed advantage results from the ability of the synthesizer 62 to use the program counter within the CPU 50 as a data pointer in the process of transferring data.

Non-intercept Configuration of Synthesizer

FIG. 2 shows the non-intercept configuration of the synthesizer peripheral apparatus in a computer system. The computer system's CPU 100 is connected to the computer system's memory 114, one or more I/O devices 122, and a synthesizer 108, which comprises a preferred embodiment of the present invention, by means of a data bus 110, a control bus 112, and address decoders 104 and 118 which decode the address bus 52 and provide decoder signals 106 to the synthesizer 108 and decoded signals 120 to I/O devices 122. The address bus 102 connects directly to the memory 114, and in some cases, selected address bus signals 116 are connected directly to I/O devices. All of said buses and decoder logic are well known in the prior art and comprise the standard and accepted methodology for providing means of interface between a CPU and the component parts of the computer system located outside the CPU.

Unlike the full intercept configuration shown in FIG. 1, the CPU 100 is connected directly to the memory 114 and I/O devices 122. The synthesizer 108 is connected in parallel with memory 114 and I/O devices 122 by means of the common data bus 110 and the common control bus 112.

The major advantage of the non-intercept configuration is that the synthesizer is connected to the computer system in the same way as a memory module, and thus can be easily added to almost any computer system that provides for the addition of memory modules.

Structure of Full Intercept Synthesizer

Figure 3:
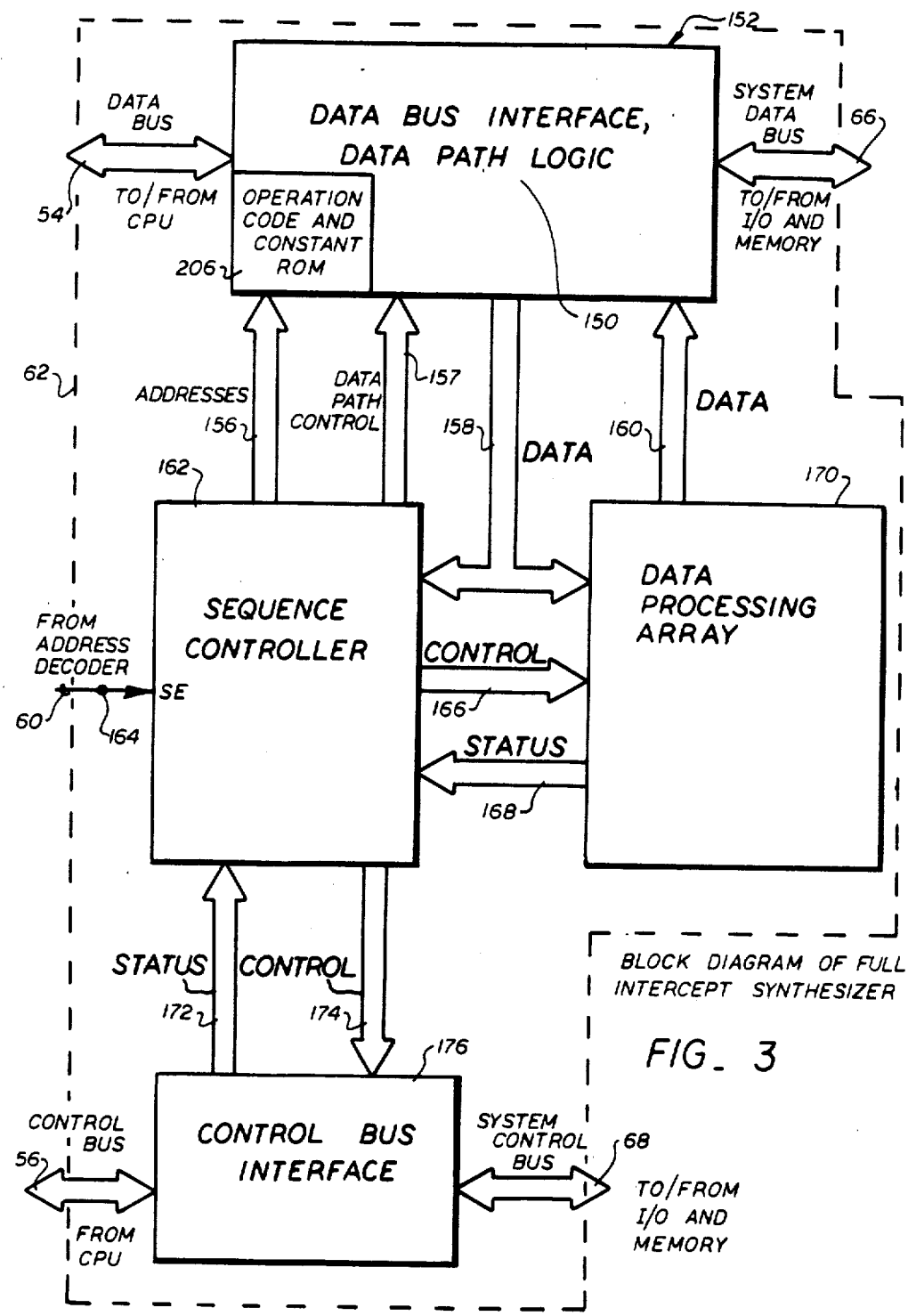
FIG. 3 is a block diagram of a full intercept synthesizer showing the sequence controller, data bus interface, control bus interface, and data processing array blocks.

A full intercept synthesizer shown as block 62 of FIG. 1 has the structure depicted in the block diagram of FIG. 3, comprising a preferred embodiment of the present invention. In FIG. 3 the connections 54, 164, and 56 to the CPU and address decoder portion of the computer system are shown on the left, while the connections 66 and 68 to the memory and I/O portions of the computer system are shown on the right. The synthesizer is comprised of four fundamental component blocks: A sequence controller 162, a data processing array 170, a control bus interface 176, and a data bus interface 152 which includes data path logic 150 and an operation code and constant Read Only Memory (ROM) 206.

A data bus 54 connects the CPU and the data bus interface 152, a control bus 56 connects the CPU and the control bus interface 176, and a Start Enable (SE) signal 164 from an address decoder (FIG. 1 58) connects to the sequence controller 162. A system data bus 66 connects the data bus interface 152 to the memory and I/O portions of the computer system, and a system control bus 68 connects the control bus interface 176 to the memory and I/O portions of the computer system.

Sequence Controller (Full Intercept)

The primary control logic of the synthesizer resides within the sequence controller 162 which provides addresses 156 to the data bus interface 152 to select operation codes and constants in the operation code and constant ROM 206, data path control signals 157 to the data path logic 150 within the data bus interface 152 to select among the sources and destinations for data and instructions, control signals 166 to the data processing array 170 to select combinatorial logic and data processing operations, and control signals 174 to the control bus interface 176 to select among control and status signal paths. Such control signals and addresses are generated within the sequence controller 162 by a state machine designed to perform a selected range of functions in connection with a selected type of CPU for each specific embodiment of a synthesizer. The design of such state machines is well known in the prior art. Such state machines generally consist of a state register, a combinatorial logic array to select the next state of the machine, and a second combinatorial logic array to provide the output control signals. The detailed design of such a sequence controller for a specific embodiment of a synthesizer depends upon the selected range of functions to be performed by such a synthesizer and on the instruction set implemented by the selected CPU. The design details of such state machines will no doubt become apparent to those skilled in the art after having read the detailed descriptions contained herein of preferred embodiments of the present invention.

The inputs to the sequence controller 162 include data signals 158 from the data bus interface 152, status signals 172 from the control bus interface 176, status signals 168 from the data processing array 170, and signals 60 from a memory address decoder (FIG. 1 58). The Start Enable (SE) 164 input to the sequence controller is the decode of a memory address assigned to the synthesizer for initiation of its operation. In the full intercept configuration it is the only memory address decode from the CPU that must be connected to the synthesizer. Other memory address decode inputs 60 may be used when the synthesizer has control over a limited memory space.

Data Processing Array (Full Intercept)

The data processing array 170 performs data processing and combinatorial logic functions as directed by the sequence controller 162. The design of such a data processing array is well known in the prior art. The detailed design of such a data processing array for a specific embodiment of a synthesizer depends upon the selected range of functions to be performed by such a synthesizer and on the instruction set implemented by the selected CPU. The complexity of the data processing array 170 may vary from a simple counter to a combination of memory elements, logic for performing arithmetic and logic operations, and one or more interconnecting buses, such as would be found internal to a CPU. The design details of such data processing arrays will no doubt become apparent to those skilled in the art after having read the detailed descriptions contained herein of preferred embodiments of the present invention.

Inputs to the data processing array 170 consist of the control signals 166 from the sequence controller 162 and data 158 from the data bus interface 152. The outputs from the data processing array 170 consist of status signals 168 to the sequence controller 162 indicating the results of arithmetic or logic operations, and a data output 160, to the data bus interface 152.

Control Bus Interface (Full Intercept)

The control bus interface 176 contains logic which routes control and status signals among the CPU (via the control bus 56), the memory and I/O portions of the computer system (via the system control bus 68), and the sequence controller 162 (via the internal status and control buses 172 and 174 respectively). When the synthesizer has not been selected to perform an operation, the sequence controller 162 directs the control bus interface 176 to pass all control signals unchanged between the control bus 56 and the system control bus 68.

The logic design of the control bus interface 176 for a specific embodiment of a synthesizer depends upon the selected range of functions to be performed by such a synthesizer and on the instruction set, control signals, and status signals implemented by the selected CPU. For example, the complexity of the control bus interface 176 may vary from a single Read signal to one or more buses and a logic block capable of converting Read operations to Write operations. In the intercept configuration, a memory address invert control signal may be included in the control outputs to the memory if the direction that the memory must be scanned in order to accomplish a data processing operation is in descending order.

The design details of such a control bus interface 176 will no doubt become apparent to those skilled in the art after having read the detailed descriptions contained herein of preferred embodiments of the present invention.

Data Bus Interface (Full Intercept)

The data bus interface 152 contains data path logic 150 which routes data among the CPU (via the data bus 54), the memory and I/O portions of the computer system (via the system data bus 66), the sequence controller 162 and the data processing array 170 (via an internal data bus 158) in response to data path control signals 157 received from the sequence controller 162. The data bus interface 152 also contains the operation code and constant ROM 206 which contains instruction operation codes and other constants selected by ROM address signals 156 from the sequence controller 172. When the synthesizer has not been selected to perform an operation, the sequence controller 162 directs the data path logic 150 to pass data signals unchanged between the data bus 54 and the system data bus 66. During operations of the synthesizer, various data paths may be selected by the sequence controller 162.

Figure 4:
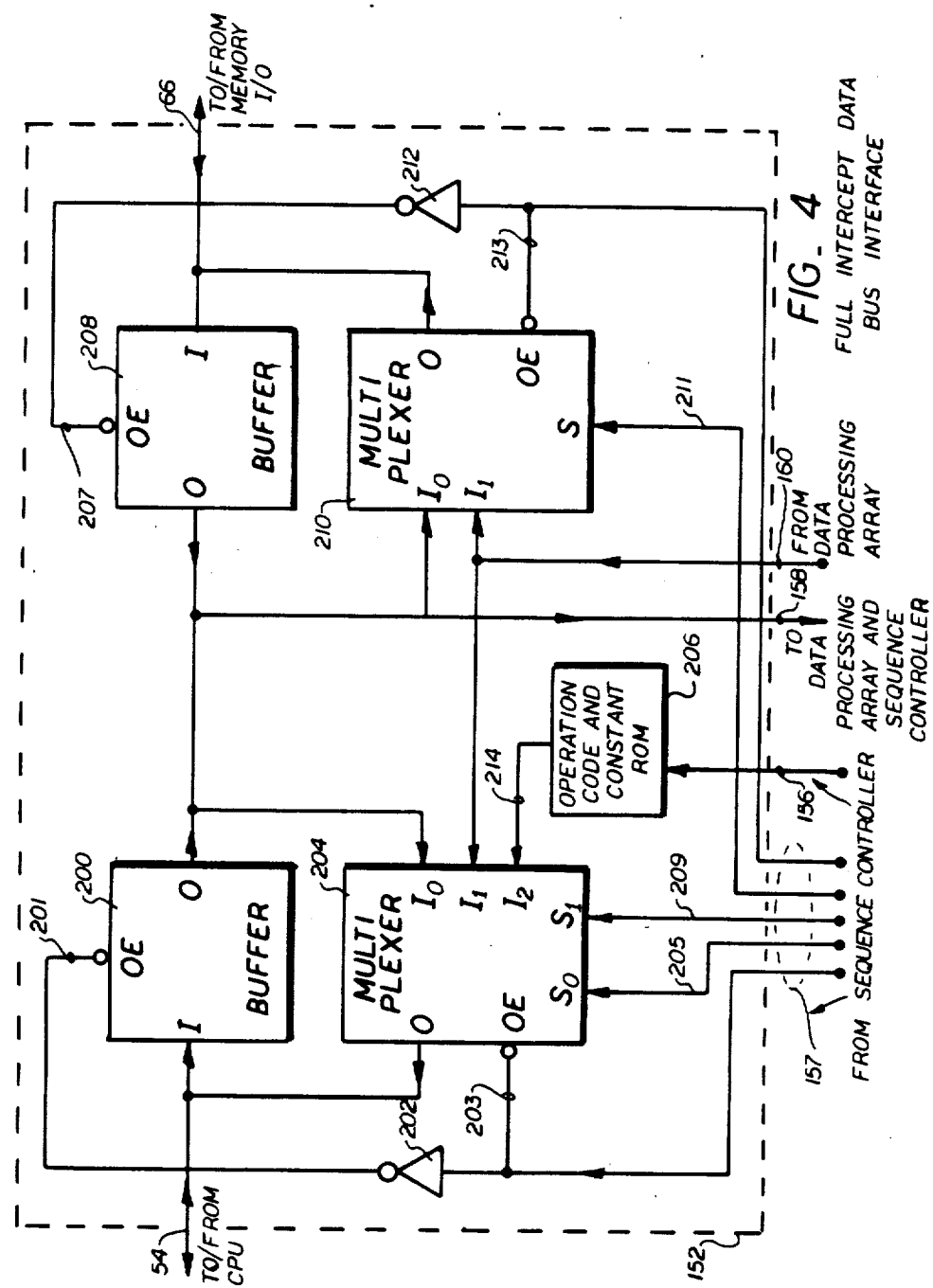
FIG. 4 is a detailed block diagram of the data bus interface portion of a full intercept synthesizer.

Turning to FIG. 4, the data bus interface block 152 is shown to be further comprised of bus buffers 200 and 208, multiplexers 204 and 210, inverters 202 and 212, and an operation code and constant ROM 206. All of the buffer, multiplexer and inverter devices are well known in the prior art. Buffes 200 and 208 switch buses (54 and 66) to an internal bus (158) when selected Output Enable (OE) signals 201 and 207 are active. Multiplexer 204 switches one of buses 158, 160, and 214 to data bus 54 based on the state of control signals 205 and 209 when output enable signal 203 is active. Multiplexer 210 switches one of buses 158 or 160 to system data bus 66 based on the state of control signal 211 when output enable signal 213 is active. All buffers and multiplexers have multiple connections to the various buses according to the number of bus signals to be switched in the particular computer system in which the present invention is applied.

Many Read Only Memory devices suitable for implementing the operation code and constant ROM 206 are well known in the prior art, but the selection, content, and organization of such an operation code and constant ROM 206 for a specific embodiment of a synthesizer depends upon the selected range of functions to be performed by such a synthesizer and on the instruction set implemented by a selected CPU. ROM address signals 156 from the sequence controller 162 select the instruction operation codes and constants to be supplied to multiplexer 204 via an internal bus 214 having multiple connections from the operation code and constant ROM 206 according to the size and organization of this ROM. The design details of such an operation code and constant ROM 206 for a specific embodiment of a synthesizer will no doubt become apparent to those skilled in the art after having read the detailed descriptions contained herein of preferred embodiments of the present invention.

Structure of Non-Intercept Synthesizer

Figure 5:
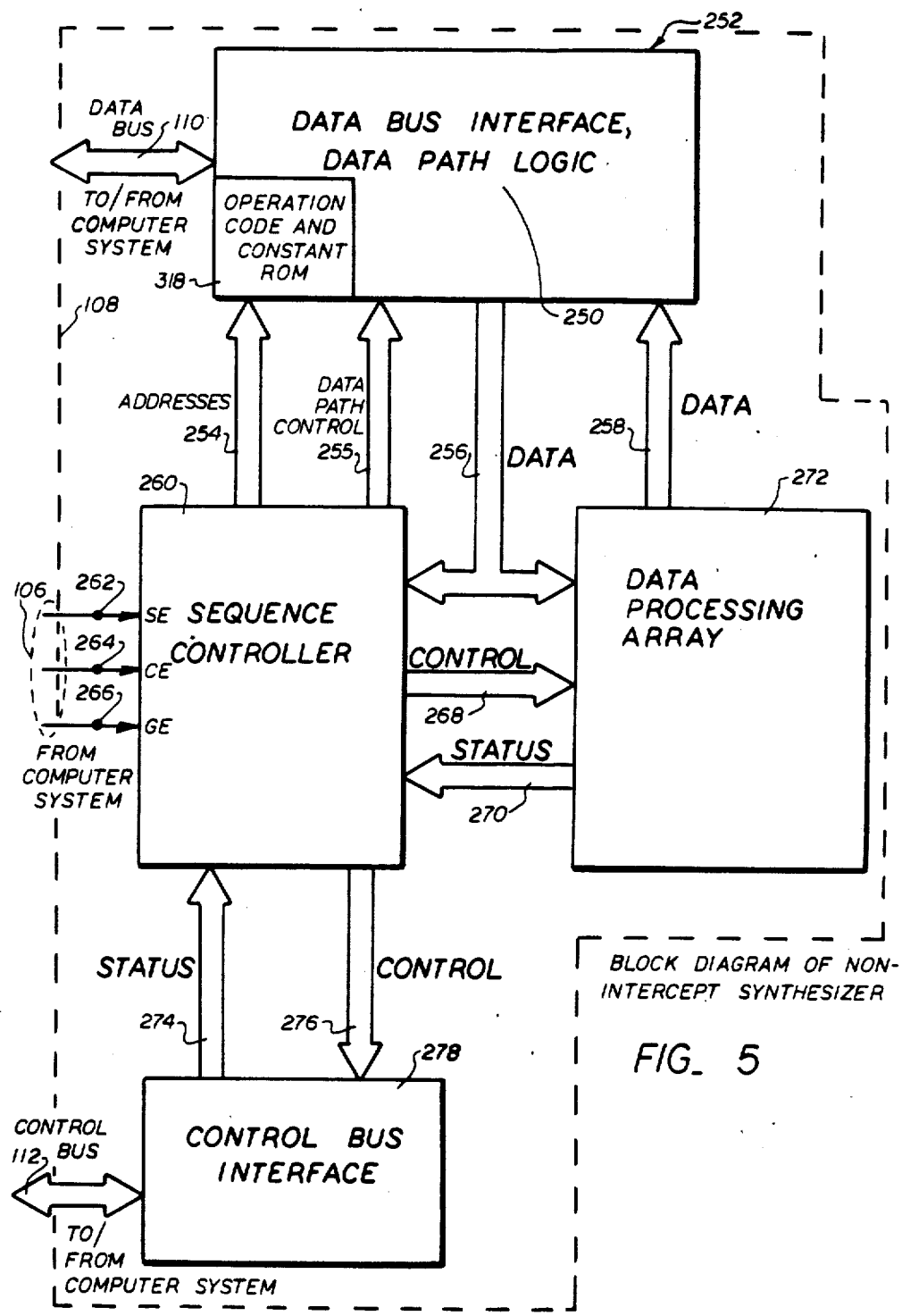
FIG. 5 is a block diagram of a non-intercept synthesizer showing the sequence controller, data bus interface, control bus interface, and data processing array blocks.

A non-intercept synthesizer shown as block 108 of FIG. 2 has the structure depicted in the block diagram of FIG. 5, comprising a preferred embodiment of the present invention. The synthesizer is comprised of four fundamental component blocks: A sequence controller 260, a data processing array 272, a control bus interface 278, and a data bus interface 252 which includes data path logic 250 and an operation code and constant Read Only Memory (ROM) 318.

A data bus 110 connects the computer system to the data bus interface 252, and a control bus 112 connects the computer system to the control bus interface 278. Memory address decode signals 106 from memory address decoder (FIG. 2 104) include a Start Enable (SE) signal 262, a control Enable (CE) signal 264, and a Guard Enable (GE) signal 266 connecting the computer system to the sequence controller 260. Unlike the full intercept configuration, the non-intercept configuration does not separate the CPU from the memory and I/O sections of the computer system, therefore there is no separate system data bus and system control bus.

Sequence Controller (Non-Intercept)

The primary control logic of the synthesizer resides within the sequence controller 260 which provides addresses 254 to the data bus interface 252 to select operation codes an constants in the operation code and constant ROM 318, data path control signals 255 to the data path logic 250 within the data bus interface 252 to select among the sources and destinations for data and instructions, control signals 268 to the data processing array 272 to select combinatorial logic and data processing operations, and control signals 276 to the control bus interface 278 to select among control and status signal paths. Such control signals are generated within the sequence controller 260 by a state machine designed to perform a selected range of functions in connections with a selected type of CPU for each specific embodiment of a synthesizer. The design of such state machines is well known in the prior art. Such state machines generally consist of a state register, a combinatorial logic array to select the next state of the machine, and a second combinatorial logic array to provide the output control signals. The detailed design of such a sequence controller for a specific embodiment of a synthesizer depends upon the selected range of functions to be performed by such a synthesizer and on the instruction set implemented by the selected CPU. The design details of such state machines will no doubt become apparent to those skilled in the art after having read the detailed descriptions contained herein of preferred embodiments of the present invention.

The inputs to the sequence controller 260 include data signals 256 from the data bus interface 252, status signals 274 from the control bus interface 278, status signals 270 from the data processing array 272, and signals 106 from a memory address decoder (FIG. 2 104). A Start Enable (SE) 262 input to the sequence controller is a decode of the memory address assigned to the synthesizer for initiation of its operation. In the non-intercept configuration the memory space over which the synthesizer can assume control may be limited, requiring the use of a Control Enable (CE) 264 signal and a Guard Enable (GE) 266 connected to the synthesizer. The CE signal 264 is a decode of the memory address block assigned to the synthesizer for the purpose of supplying instructions. The GE signal 266 is a decode of a small portion of the top of the memory address block defined by the CE signal 264 which serves to notify the sequence controller 260 that the CPU's program counter is approaching the limit of the memory block assigned to the synthesizer.

Data Processing Array (Non-Intercept)

The data processing array 272 performs data processing and combinatorial logic functions as directed by the sequence controller 260. The design of such a data processing array is well known in the prior art. The detailed design of such a data processing array for a specific embodiment of a synthesizer depends upon the selected range of functions to be performed by such a synthesizer and on the instruction set implemented by the selected CPU. The complexity of the data processing array 272 may vary from a simple counter to a collection of memory elements, logic for performing arithmetic and logic operations, and one or more interconnecting buses, such as would be found internal to a CPU. The design details of such data processing arrays will no doubt become apparent to those skilled in the art after having read the detailed descriptions contained herein of preferred embodiments of the present invention.

Inputs to the data processing array 272 consist of the control signals 268 from the sequence controller 260 and data inputs 256 from the data bus interface 252. The outputs from the data processing array 272 consist of status signals 270 to the sequence controller 260 indicating the results of arithmetic or logic operations, and a data output 258, to the data bus interface 252.

Control Bus Interface (Non-Intercept)

The control bus interface 278 contains logic which routes control and status signals between the computer system (via the control bus 112) and the sequence controller 260 (via the internal status and control buses 274 and 276 respectively).

The logic design of the control bus interface 278 for a specific embodiment of a synthesizer depends upon the selected range of functions to be performed by such a synthesizer and on the instruction set, control signals, and status signals implemented by the selected CPU. The complexity of the control bus interface 278 may vary from a single Read signal to more complex logic designed to switch the synthesizer's memory space over some or all of the computer system's memory space and to generate the Random Access Memory (RAM) inhibit signals required to overlay memory on a cycle by cycle basis. The design details of such a control bus interface 278 will no doubt become apparent to those skilled in the art after having read the detailed descriptions contained herein of preferred embodiments of the present invention.

Data Bus Interface (Non-Intercept)

The data bus interface 252 contains data path 250 logic which routes data among the computer system (via the data bus 110), the sequence controller 260 and the data processing array 272 (via an internal bus 256) in response to data path control signals 255 received from the sequence controller 260. The data bus interface 252 also contains the operation code and constant ROM 318 which contains instruction operation codes and other constants selected by ROM address signals 254 from the sequence controller. During operations of the synthesizer, various data paths may be selected by the sequence controller 260.

Figure 6:
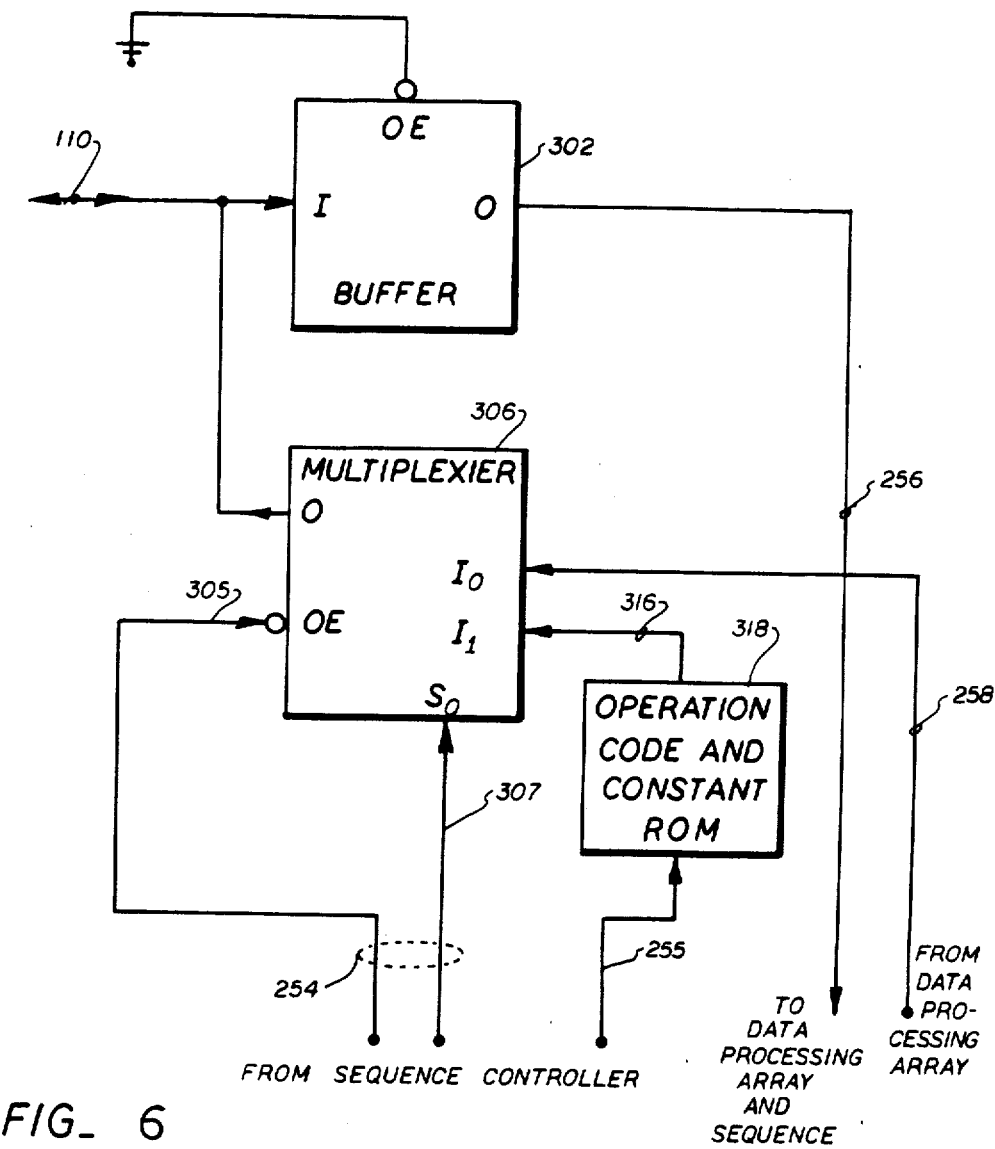
FIG. 6 is a detailed block diagram of the data bus interface portion of a non-intercept synthesizer.

Turning to FIG. 6, the data bus interface is shown to be further comprised of bus buffers 302, multiplexer 306, and an operation code and constant ROM 318. The buffers and multiplexer device are well known in the prior art. Buffers 302 connect the data bus signals 110 to an internal bus 256. Multiplexer 306 switches one of buses 258 or 316 to data bus 110 based on the state of control signal 307 when output enable signal 305 is active. The buffers and multiplexer have multiple connections to the various data buses according to the number of bus signals to be switched in the particular computer system in which the present invention is applied.

Many Read Only Memory devices suitable for implementing the operation code and constant ROM 318 are well known in the prior art, but the selection, content and organization of such an operation code and constant ROM 318 for a specific embodiment of a synthesizer depends upon the selected range of functions to be performed by such a synthesizer and on the instruction set implemented by the selected CPU. ROM address signals 255 from the sequence controller 260 select the instruction operation codes and constants to be supplied to multiplexer 306 via an internal bus 316 having multiple connections from the operation code and constant ROM 318 according to the size and organization of this ROM. The design details of such an operation code and constant ROM 318 will no doubt become apparent to those skilled in the art after having read the detailed descriptions contained herein of preferred embodiments of the present invention.

Having described the necessary apparatus to implement two preferred embodiments of the present invention, we can turn our attention to the process of adaptive instruction sequence synthesis which forms a part of the present invention.

Adaptive Instruction Sequence Synthesis Process

Figure 7:
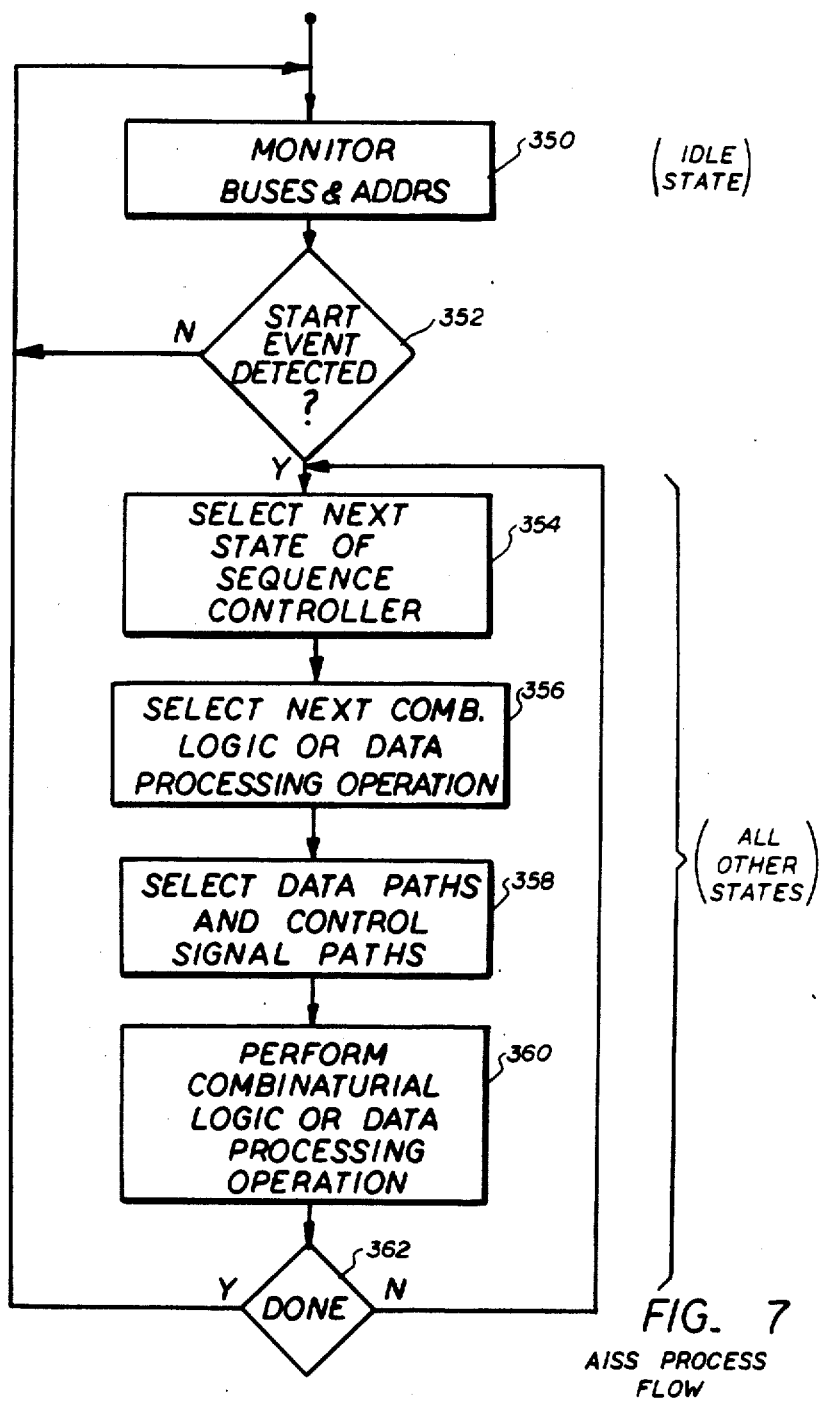
FIG. 7 is a generalized flow diagram of the process involved in adaptive instruction sequence synthesis in accordance with the present invention.

Referring to FIG. 7, the process of adaptive instruction sequence synthesis embodied in a synthesizer (FIG. 3 and FIG. 5) attached to a computer system as shown in either of its preferred embodiments, the full intercept configuration (FIG. 1) or the non-intercept configuration (FIG. 2), begins with the sequence controller (FIG. 3 162 or FIG. 5 260) within the synthesizer in an idle state, monitoring at block 350 the computer system's data bus, control bus, and decoded address bus signals, for a condition or event that activates its operation. Until such an event occurs, the computer system is controlled by instructions stored in memory and executed by its CPU, a process which is well known in the prior art. Such monitoring continues until a start event is detected at block 352. Upon detection of a start event, the synthesizer selects at at block 354 a next state for the synthesizer's sequence controller, beginning the basic process of adaptive instruction sequence synthesis. In each such state of the synthesizer's sequence controller, the synthesizer selects (at block 356) the next combinatorial logic or data processing operation to be performed by the synthesizer's data processing array (FIG. 3 170 or FIG. 5 272); selects (at block 358) the data paths and control paths among the synthesizer, the CPU, the memory, and the I/O devices in the computer system; and causes the data processing array within the synthesizer to perform the selected combinatorial logic or data processing operation, all based on the present state of the sequence controller and the status and data signals available to the sequence controller. The process steps in blocks 354, 356, 358, and 360 are repeated until the computer operation for which synthesizer operation was initiated is complete. When the computer operation assigned to the synthesizer is completed, including passing results to the computer system and returning control to the instructions in the memory of the computer system, the synthesizer (at block 362) returns to its idle state.

The following detailed description of the steps in the process of adaptive instruction sequence synthesis refers separately to the full intercept (FIG. 1, 3, and 4) configuration and to the non-intercept (FIGS. 2, 4, and 6) configuration, each comprising a preferred embodiment of the present invention.

Starting Synthesizer Operations

In any specific embodiment of the present invention, synthesizer operation may be initiated by one or more of a variety of methods by which the program being executed and the computer system itself cause a start event detectable by the synthesizer via its connections to the computer system (FIG. 1 and FIG. 2). Such methods include but are not limited to the following:

Access to a Specified Memory Location for an Instruction

The CPU may initiate synthesizer operations by fetching an instruction from a specific memory location assigned to the synthesizer for that purpose. The synthesizer detects the instruction fetch from this location by means of a Start Enable (SE) signal (164 in FIG. 3 and 262 in FIG. 5) which becomes active when an address decoder (58 in FIG. 1 and 104 in FIG. 2) decodes the assigned address. Although many different instructions may be used, the use of a Call type instruction is a natural way for a program to initiate synthesizer operations, and it allows the synthesizer to easily return control to the program memory by providing a Return instruction for the CPu to execute when the synthesizer operation is complete.

Writing to a Specified Memory Location

In some embodiments the synthesizer may be designed to start its operation when the program writes a command or a control block address to a specified memory or I/O location. The synthesizer detects the write to this location as before, by means of a Start Enable signal (164 in FIG. 3 and 262 in FIG. 5) which becomes active when an address decoder (58 in FIG. 1 and 104 in FIG. 2) decodes the assigned address. The address written to this location is then used by the synthesizer to begin the next step in the process.

If the CPU in the computer system implements an instruction queue, its operation must be considered in the design of the synthesizer.

Detection of Fetch and Execution of a Specified Instruction

A synthesizer may be designed to start its operations upon detecting the fetch and execution of a specific instruction. Most suitable for this method of initiation are instructions which perform no operation in the computer system. For example, many computers provide a set of register to register move instructions including instructions that move a register to itself, thus effectively performing no operation. In this case the synthesizer is designed to detect when such an instruction is fetched by monitoring the data bus (54 in FIG. 1 and 110 in FIG. 2) and comparing in a data processing array (170 in FIG. 3 and 272 in FIG. 5) the operation code of each instruction fetched, to codes designed to initiate the operation of the synthesizer.

If the CPU provides an instruction queue, the synthesizer must abort its operations when the queue is purged before the Start Enable instruction reaches the execution unit, and return control to the program memory. In addition, care must be taken in the use of effective no-operation instructions (NOP) which may have been assigned to the initiation of other peripherals such as co-processors.

Detection of an External Signal

A synthesizer may be designed to start its operations upon detecting an external signal by including such a signal in the decode of the Start Enable (SE) signal (164 in FIG. 3 and 262 in FIG. 5) or including such a signal in the control bus input to the synthesizer for this purpose. Such an operation is similar to an interrupt operation, but faster.

Transfer of Control from Program Memory

After detecting (FIG. 7 block 352) any of the start events described above, the synthesizer begins the process of adaptive instruction sequence synthesis (at blocks 354, 356, 358, and 360), by selecting data paths and instructions for execution by the CPU which take control of the computer system from the instructions stored in the computer system's memory. Several methods may be used to effect such a transfer of control depending upon the configuration of the synthesizer in the computer system (intercept or non-intercept), and depending upon the specific computer operations the synthesizer has been designed to perform. In any case the transfer of control occurs as a result of one or more loops through the process (at blocks 354, 356, 358, and 360), and a synthesizer must be memory mapped so that it apprears to the CPU as memory locations from which instructions may be fetched whenever the synthesizer is selected to assist the CPU in performing an operation.

Full Intercept Control Transfer

In the full intercept configuration (FIGS. 1, 3, and 4) transfer of control to the synthesizer is relatively unencumbered because of the flexibility inherent in the switching mechanisms of the data bus interface (FIG. 4). Upon the occurrence of any of the start events described above, (Referring to FIG. 3) the sequence controller 162 enters a state wherein it sends data path control signals 157 to the data bus interface 152 causing it to switch the CPU's source of instructions from the program memory (FIG. 1 64) to the synthesizer (FIG. 1 62). The synthesizer then becomes the primary source of instructions for the CPU, thereby controlling the operation of the computer system until it relinquishes control to the program memory.

Non-Intercept Control Transfer

In the non-intercept configuration (FIGS. 2, 5, and 6) the direct connections (FIG. 2, 110 and 112) between the CPU 100 and the computer system's memory 114 require that the memory space occupied by the synthesizer be carefully delineated, and the data path logic in the data bus interface (FIG. 6) be more limited than the full intercept configuration. The memory space dedicated to the synthesizer is defined by the partial memory address decode signal "CE" (FIG. 5 264). This restriction in the non-intercept configuration gives rise to a number of options for transferring control from program memory to the synthesizer after having detected any of the start conditions described herein.

In one such option for transferring control, the synthesizer may be permanently memory mapped into a small dedicated area of the computer's memory space, limiting the synthesizer's control over accesses to the remainder of memory. This option permits applications of the present invention to simple enhancements to I/O controller devices even when the number of dedicated memory addresses is very limited. If the number of such dedicated addresses can be expanded to occupy a few thousand bytes of memory space, a synthesizer may be designed to appear to the computer system as a memory whose contents dynamically change as a function of the task it is called upon to perform.

In any case of the non-intercept configuration, when control is transferred to the synthesizer, it can read the contents of computer system memory locations by issuing an appropriate instruction that causes the contents of the desired location to appear on the data bus where it can be read via the data bus interface 252.

If the synthesizer does not control all of the computer system's memory, it must periodically interrupt the adaptively synthesized sequence of instructions and issue a jump instruction to keep the program counter within the synthesizer's assigned memory space. The "GE" 266 memory address decode input is used to notify the synthesizer that the program counter is near or at the limit of the area of memory assigned to the synthesizer.

Non-Intercept with Auto Bank Switch

Other options for transferring control to the synthesizer are available in many computer systems which incorporate into their control bus structures memory inhibit signals such as those used to overlay memory with either I/O locations or a startup ROM. In such systems a synthesizer can control these signals via the control bus interface (FIG. 5 278) to control access to the memory space of the computer by bank switching techniques. When activated by any of the start events described herein, a synthesizer may be designed to bank switch itself into the entire memory space of the computer and thus overlay the contents of memory with an adaptively synthesized stream of instructions provided independently of the value of the program counter in the CPU. When the operation is completed the synthesizer returns control to the program by issuing a relative jump instruction that restores the program counter to the memory location immediately following the instruction that initiated the synthesizer's operation, while concurrently bank switching itself out of the computer's memory space.

The non-intercept configuration with auto bank switch allows the synthesizer to overlay and replace the RAM memory, on a memory cycle by cycle basis. The synthesizer selects either the memory or the internal logic of the synthesizer as the source of dta or instructions for the CPU.

After synthesizer operation has been started and control transferred from the program memory by one of the methods described herein or any other method, it is necessary for the synthesizer to peform one or more loops through the process (at blocks 354, 356, 358, and 360) for the purpose of acquiring parameters from the calling program to further specify the computer operation to be performed.

Acquisition of Commands and Parameters

The program calling the synthesizer must supply information in the form of commands to tell the synthesizer which of its operations to perform, and parameters to define the specific data, limits, and constants to be used in each operation.

In the past, commands and parameters have been provided to peripheral devices by writing such commands and parameters to specified memory or I/O locations. Although this method can be used with a synthesizer, the ability of a synthesizer to supply instructions for the CPU to execute provides a much faster and more efficient method for a synthesizer to obtain the required command and parameters. The synthesizer simply issues instructions which the CPU executes, causing such commands and parameters to appear on the data bus where they are read by the synthesizer via its data bus interface. Parameters may be provided to the synthesizer in various ways, including, but not limited to the following:

Control Block and Call Method

Prior to starting synthesizer operations by executing a Call instruction that accesses a specific memory location assigned to the synthesizer for that purpose, this method requires the calling program to establish in memory a control block of locations whose contents define the operation that the synthesizer is to assist the CPU to perform, including parameters that further define the details of said operation.

Further, the calling program must load a memory location or a CPU register with a pointer to the starting address of this control block. The choice of a memory location or a register depends upon the instruction set of the computer.

After the instruction fetch to the specified memory location is executed, the synthesizer supplies instructions to the CPU which cause the command and parameter information from the memory locations and registers to appear on the data bus. As this information appears on the bus, the synthesizer stores the information in internal registers. The first parameter read may be viewed as a command that selects the type of operation for the synthesizer to perform in a manner similar to an instruction's operation code. Subsequent parameters further define the exact nature of the operation, in a manner similar to the operand portion of an instruction. The number of parameters to be acquired may be specified as function of the command, as one of the first parameters, or by a flag bit in the last parameter.

The instructions supplied and the method used by the synthesizer to acquire this information are dependent upon the instruction set of the CPU and on the configuration of the synthesizer in the computer system (intercept or non-intercept).

Command and Parameter Fetching (Non-intercept)

If the CPU's instruction set includes a Load Register Indirect instruction, the program will have loaded a pointer to the control block in a specified one of these registers. When the synthesizer supplies a sequence of such instructions to the CPU, the synthesizer collects such command and parameters as they appear on the data bus as a result of the CPU executing these instructions.

If the CPU's instruction set includes auto-increment capability, the synthesizer can be designed to use such instructions; if not, the synthesizer can be designed to supply register increment instructions after each load indirect instruction.

If the CPU's instruction set is very simple, the synthesizer can be designed to implement the equivalent of a memory indirect block fetch operation. In such an operation the synthesizer supplies an absolute addressed load instruction to fetch the address of the control block from a specified fixed memory location, collecting this address as it appears on the data bus, then continues supplying the sequence of absolute addressed load instructions starting with the control block address just fetched, incrementing the address field of the instruction after each execution.

Command and Parameter Fetching (Full Intercept)

As in the previous case, the synthesizer supplies instructions that cause the command and parameter information to become available on the data bus for acquisition. However, in the intercept configuration (FIG. 1 and FIG. 3), the synthesizer provides a path between the memory and the CPU for both the data bus and the control bus, so that it may simultaneously read the contents of memory accessed by the CPU and provide the CPU with an instruction that it has selected based upon internal logic. In the intercept configuration the synthesizer makes use of the program counter in the CPU as a data pointer for collecting the command and parameters, and for accessing data from the memory while performing the specified operation.

As in the non-intercept configuration, the specific instruction stream provided by the synthesizer is dependent upon the instruction set of the CPU. In this case the types of Jump instructions available are of concern.

If the CPU's instruction set includes a jump register indirect instruction, it will be the first instruction supplied by the synthesizer. The program will have loaded the selected register with the starting address of the control block, so that after the CPU executes this instruction, the next memory access is to the first location in the control block. As the synthesizer reads the contents of this memory location from the system data bus connected to the memory, it supplies the next instruction for the CPU to execute. In most cases the next instructions are no-operation instructions that simply advance the program counter to the next location in the control block so that the contents of these next locations appear on the data bus and are acquired by the synthesizer as before.

If the CPU does not provide any register or memory indirect Jump instructions, the synthesizer manufactures such instructions by supplying an absolute addressed Jump to the location immediately preceding the address of the control block. When the CPU accesses this location for an instruction, the synthesizer ignores the contents of the memory location and supplies a second absolute addressed Jump operation code to the CPU. As a result the program counter advances to fetch the address for this Jump, and the synthesizer allows the contents of memory containing the starting address of the control block to be passed through its internal data bus and supplied to the CPU as the instruction's Jump address. Then the command and parameters can be collected by the synthesizer as before.

Adaptive Synthesis of Instructions

After the synthesizer has collected a sufficient number of parameters to begin the selected operation, it performs the sequence control, combinatorial logic, and data processing operations required to select and provide additional instructions to the CPU for execution. In many cases the synthesizer also performs data processing operations that directly carry out the computer operation selected by the program.

It is important to note that the purpose of the adaptive instruction sequence synthesis process and its embodiment in a synthesizer is to speed up the selected operation by supplying the CPU with only those instructions that are effective in carrying out the intended operations, and to remove from the instruction stream those "overhead" instructions that would otherwise be executed by a program to accomplish the same operations. The synthesizer performs the functions of such overhead instructions including loop control, address calculation, compare operations, and other functions in its hardware logic concurrently with each memory cycle of the CPU.

It is also important to note that when the synthesizer is operating, the memory locations accessed as the CPU executes instructions, whether for the purpose of fetching additional instructions or for data, are selected by the synthesizer, since the synthesizer is supplying the instructions that result in such memory accesses. Such synthesizer selected memory accesses require the information to appear on the data bus only once, replacing program controlled accesses which often require information to pass over the data bus twice, once during memory accesses, and a second time during input or output operations.

Full Intercept Configuration

In operation and referring to the full intercept structure of the synthesizer (FIG.3), additional loops through the process (at blocks 354, 356, 358, and 360) resume after parameter acquisition when the sequence controller 162 enters a state which sends control signals over its internal control bus 166 to the data processing array 170, instructing the data processing array to carry out necessary data processing and combinatorial logic operations using the parameters received during the above-described process. The data processing array 170 may contain any combination of logic or arithmetic processing units depending upon the application for which the synthesizer 20 was configured. If the data processing array 170 requires data to perform its tasks, it obtains this data via the data bus interface 152 and its internal data bus 158. As a result of the processing performed by the data processing array 170, the sequence controller 162 receives status signals over the status portion of the internal bus interface 168 and the data bus interface 152 receives resulting data, if any, via the internal data bus 160. These status and data signals define the next state of the sequence controller 162 which in turn controls the selection of the operation codes for the next instructions to be executed by the CPU 50.

The internal operation of the sequence controller 162 can be viewed as a simple state machine designed to perform the range of functions of a particular synthesizer, and operated in most cases at a clock rate no faster that the rate at which the computer performs memory access cycles.

The control outputs 157, 166, and 174 and the addresses 156 generated by the sequence controller 162 and the next state of the state machine within the sequence controller 162, are state dependent functions of the inputs to the sequence controller 162 from the data bus interface 152, the data processing array 170, and the control bus interface 176.

The state machine in the sequence controller 162 in any specific embodiment of the present invention is designed to supply outputs which select instruction operation codes from the operation code and constant ROM (FIG. 3, 206) and route said operation codes via multiplexers 204 to the data bus 54 where they are available for execution by the CPU. The selection of appropriate operation codes by the sequence controller is based on the present state of the state machine and inputs to the state machine from the other elements of the synthesizer.

The sequence controller 162 generates the necesary control signals and selects the next state to control the process of instruction and operand synthesis. The state of the sequence controller 162 is the determining factor in the process. If, for example, a particular state supplies an operation code to the CPU 50 which requires operands, the next state selected from this state will be such that the synthesizer will supply those requisite operands from the correct internal source or, in some instances, from the system's memory. All of these operations within the synthesizer occur concurrently with each memory cycle of the CPU.

When the CPU 50 completes execution of an instruction, the sequence controller selects the next instruction by means of addresses 156 to the operation code and constant ROM 206 in the data bus interface 152.

Sequence controller 162 sends data path control signals 157 to the data bus interface 152 to select the data path for each memory access. If the CPU is performing a read operation, the source from which the data is supplied to the CPU's data bus may be any of the following: the contents of the memory location addressed by the address bus; a state dependent instruction operation code from the operation code and constant ROM (FIG. 3 206); a state dependent instruction operand from the operation code and constant ROM (FIG. 3 206); or the contents of a register in the data processing array 170, which may be an instruction operation code, an instruction operand, or data.

Referring to FIG. 3, if the CPU is performing a data read operation, and the memory has been selected as the source from which the data will be supplied to the data bus 54, the data path control outputs 157 from the sequence controller may also route the data to the sequence controller or the data processing array via internal data bus 158, where such data may be used to affect the next state of the sequence controller or may be used as one of the operands in an arithmetic or logical operation performed in the data processing array.

When the synthesizer's state machine is monitoring the execution of the program in its idle state at block 350 of FIG. 7, the only data source is the contents of memory selected by the address bus. A useful example of a synthesizer data processing operation is comparing every operation code read from the memory against a constant, if this method is selected to initiate the operation of the synthesizer.

If the CPU is performing a data read operation, for any purpose, the sequence controller can independently select both the source of the data for the CPU and the function to be performed in regards to the memory location addressed by the CPU. As examples of data and control path selection, the sequence controller may use the value being read from the memory location for any one of the above described purposes, and at the same time supply the CPU with an instruction operation code; or convert the read operation from the CPU side, to a memory write operation on the memory side, writing a value into the memory location that had been addressed by the CPU for a read operation.

It will often be necessary or desirable for the synthesizer to transfer information to the CPU by means of a CPU register. If such a need arises, the synthesizer may provide the CPU with a load immediate instruction, followed by the data to be transferred.

The sequence controller continues the process of instruction synthesis in the manner which has been previously described herein, determining its next state by the use of internal or external data processing or combinatorial logic. The CPU carries out each instruction as the synthesizer provides it via the data bus. After each instruction is issued to the CPU the synthesizer deterines (FIG. 7 block 362) whether the task in which the CPU and the synthesizer have been cooperating is complete. If not, it performs one more loops through the process (at FIG. 7, blocks 354, 356, 358, and 360) until it has completed its task. When the synthesizer has completed its task it returns to the monitoring step at block 350.

Non-Intercept Configuration

The Adaptive Instruction Sequence Synthesis process (FIG. 7) for the non-intercept configuration (FIG. 2) is similar to that described above for the full intercept configuration (FIG. 1). The key advantage of the non-intercept configuration (FIG. 2) is the lower cost and the ease with which the present invention may be applied in existing computer systems. The non-intercept configuration (FIG. 2) lacks separate system buses (FIG. 1 66 and 68), which limits its ability to address memory space, eliminates the possibility of using the CPU's program counter as a data pointer, and eliminates the possibility of performing other operations which require simultaneous use of the data bus and the system data bus.

Although significant performance increases over previous methods can be obtained with a non-intercept synthesizer (FIG. 5), it will not achieve the speed increases possible with the full intercept synthesizer (FIG. 3). While the user of memory inhibit signals permits the synthesizer to overlay the entire memory space, the non-intercept synthesizer (FIG. 5) cannot read directly the contents of the memory locations being overlaid. In order to obtain the contents of system memory in the non-intercept configuration, the synthesizer must provide the CPU with memory read instructions, and read the data from the bus that results from the execution of these instructions.

Resuming the detailed description of the process (FIG. 7), and referring to the non-intercept configuration of the synthesizer structure (FIG. 5), the synthesizer performs one or more additional loops through the process (at FIG. 7, blocks 354, 356, 358, and 360) after initiation of synthesizer operations and parameter acquisition by the synthesizer. The synthesizer retains contol of the computer system that it acquired in block 352. In operation, the sequence controller 260 sends control signals over its internal control bus 268 to the data processing array 272, instructing the data processing array 272 to carry out the necessary data processing and combinatorial logic operations to execute the selected operations using parameters received during the process described above. The data processing array 272 may contain any combination of logic, memory, and arithmetic processing units depending upon the application for which the synthesizer was configured. If the data processing array 272 requires data to perform its tasks, it obtains this data via the data bus interface 252 and its internal data bus 256. As a result of the processing performed by the data processing array 272, the sequence controller 260 receives status signals over the status portion of the internal bus interface 270 and the data bus interface 252 receives resulting data, if any, via the internal data bus 258. These status and data signals define the next state of the sequence controller 260 which in turn controls the selection of the operation code for the next instructions to be executed by the CPU 100 (FIG. 2).

The internal operation of the sequence controller 260 can be viewed as a simple state machine designed to perform the range of functions of a particular synthesizer, and operated in most cases at a clock rate no faster that the rate at which the computer performs memory access cycles.

The control outputs 255, 268, and 276 and addresses 254 generated by the sequence controller 260 and the next state of the state machine within the sequence controller 260, are state dependent functions of the inputs to the sequence controller 260 from the data bus interface 252, the data processing array 272, and the control bus interface 278.

The state machine in the sequence controller 260 in any specific embodiment of the present invention is designed to supply addresses 254 which select instruction operation codes from the operation code and constant ROM (FIG. 6, 318) and route said operation codes via a multiplexer (FIG. 6, 306) to the data bus 110 where they are available for execution by the CPU. The selection of appropriate operation codes by the sequence controller 260 is based on the present state of the state machine and inputs to the state machine from the other elements of the synthesizer.

The sequence controller 260 generates the necessary control signals and selects the next state to control the process of instruction operation code and operand synthesis. The state of the sequence controller 260 is the determining factor in the process; if in a particular state the sequence controller 260 supplies an operation code to the CPU 100 which requires operands, the next state selected from this state will be such that the synthesizer will supply those requisite operands from the correct internal sourse or, in some instances, from the system's memory. In the non-intercept configuration the state of the sequence controller 260 also controls system memory bank selection by causing the control bus interference 278 to activate the appropriate signals on the control bus 112. All of these operations within the synthesizer occur during execution of instructions supplied to the CPU.

When the CPU 100 completes execution of an instruction, the sequence controlle 260 selects the next instruction by means of addresses 254 to the operation code and constant ROM in the data bus interference 252.

The sequence controller 260 sends data path control outputs 255 to the data bus interface 252 to select the data path and sends control outputs 276 to the control bus interface 278 to select either an appropriate memory bank or the synthesizer as the source of data and instructions for each operation. If the CPU is performing a read operation, the source from which the data is supplied to the CPU's data bus may be any of the following: the contents of the memory location addressed by the address bus; a state dependent instruction operation code from the operation code and constant ROM (FIG. 6 318); a state dependent instruction operand from the operation code and constant ROM (FIG. 6 318); or the contents of a register in the data processing array 272, which may be an instruction operation code, an instruction operand, or data.

Synthesizer to Data bus Transfers

It will often be necessary or desirable for the synthesizer to transfer information to the CPU by means of a CPU register. If such a need arises, the synthesizer may place on the data bus 110 a load immediate instruction, followed by the data to be transferred to the CPU.

If the operation being performed by the synthesizer requires transferring data from the synthesizer to the memory, many CPU types require that the synthesizer place on the data bus 110 a two instructions sequence to be executed: a load register immediate instruction with the data to be transferred provided as the immediate field, followed by a store register instruction to the desired location. If a store immediate register indirect with auto increment instruction is available in the instruction set of the CPU, this instruction alone can effect most such transfers.

If the synthesizer is performing an operation which involves, for example, waiting for a data from a peripheral device such as a disk drive, when the CPU completes execution of the current instruction, the sequence controller 260 may send addresses 254 to the operation code and constant ROM (FIG. 6 318) in the data bus interface 252 causing it to issue effective NOP instructions to the CPU until the peripheral device responds, or until a timer internal to the data processing array 272 indicates an error has occured. In cases when limited memory space is allocated to the synthesizer, such effective NOP instructions would be replaced with Jump instructions to maintain the CPU in a tight loop and control the CPU's program counter until such response conditions are met.

Data Bus to Synthesizer Transfers

Referring to FIG. 5, if the CPU is performing a data read operation, and the data bus interface 252 has selected the memory as the source from which the data will be supplied to the data bus 110, the data path control outputs 255 from the sequence controller 260 may also route the data back to the sequence controller 260 or the data processing array 272 via internal data bus 256, where such data may be used to affect the next state of the sequence controller 260 or may be used as one of the operands in an arithmetic or logical operation performed in the data processing array 272. The synthesizer may use the CPU's memory read signal in the control bus 112 via the control bus interface 278 as a write strobe to write such data into registers or memory within the data processing array 272 or the sequence controller 260.

In the non-intercept configuration the fastest access to the contents of system memory by the synthesizer is accomplished if the CPU's instruction set provides a load register indirect instruction with an auto increment. In this case the synthesizer need only provide a sequence of these instructions with the register select field specifying a register which was initialized by the program with the starting address of the memory area to be read before calling the synthesizer.

If a CPU's load register indirect instruction does not include an auto increment capability, it is necessary for the synthesizer to supply an instruction that increments the specified register prior to supplying successive Load register indirect instructions. The synthesizer then provides absolute addressed load register instructions to the CPU, with the address portion of each instruction obtained from the data processing array 272 section of the synthesizer. The data processing array 272 increments the address after each use.

The sequence controller 260 continues controlling the process of adaptive instruction sequence synthesis in the manner which was previously described herein, determining the next state of its state machine by the user of internal or external data processing or combinatorial logic, as described above. The CPU carries out each instruction as the synthesizer provides it via the data bus. After each instruction is issued to the CPU the synthesizer determines (FIG. 7 block 362) whether the task in which the processor and the synthesizer have been cooperating is complete. If not, it performs one or more loops through the process (at FIG. 7, blocks 354, 356, 358, and 360) until it has completed its task. When the synthesizer has completed its task it returns to the monitoring step at block 350.

Report Results of Operations

In either the full intercept or the non-intercept configuration, the synthesizer reports, when required, results of the computer operation performed by performing one or more additional loops through the process (at FIG. 7, blocks 354, 356, 358, and 360) placing instructions on the data bus which set appropriate flags in the CPU, load registers in the CPU, write to memory or other means.

Return Control to Program Memory

In either the full intercept or the non-intercept configuration, the synthesizer supplies an instruction to the CPU to restore the program counter to the appropriate value to return control of the computer system to the instructions contained in the program memory. If the synthesizer was started by a call instruction, a return instruction will be issued. If started by any of the bank switching methods discussed above, an appropriate jump instruction will be issued. In any case control is returned (at block 362) to the program that was in effect before control was transferred to the synthesizer in block 352, and program execution continues from that point using whatever results were provided by the synthesizer's operations.

IMPLEMENTATIONS OF THE INVENTION

In all implementations of the invention, the synthesizer must be made to appear to the CPU as if it were a portion of the memory of the computer system. This memory must further be so interpreted by the CPU that the CPU is able to retrieve at least one instruction from the space which is apparently or actually occupied by the synthesizer.

Simplest Implementation

In its simplest implementations, the synthesizer may occupy only a few memory locations. As few as eight bytes of memory space are adequate in many applications. Its function in such situations is usually limited to providing enhanced input/output capability to the computer system.

This simplest implementation may be added to an existing I/O controller integrated circuit such as a floppy disk controller or local area network device, where it provides a more intelligent and lower cost interface. Its use may in many instances eliminates the necessity of incorporating a DMA controller into the design.

Program ROM Overlay

In its next most complex implementation, the synthesizer appears as a program ROM overlay. In this implementation, the synthesizer can increase the speed of I/O operations, as can its simplest embodiment as explained above; and perform complex data processing tasks. The synthesizer bank switches up to several thousand bytes of the computer system memory from a program ROM then takes control of the computer's access to this section of the memory.

The Program ROM overlaid by the synthesizer when it is initiated might, for example, contain a combination of operating system programs for the computer system and software subroutines which use the capability of the synthesizer to perform complex data management operations. It is necessary only that the synthesizer be able to gain READ access to the computer data bus for this implementation to be feasible.

Since in this implementation the synthesizer may be packaged into an integrated circuit with the same pin connections as a standard ROM device, the invention may be incorporated into an existing computer by the simple means of inserting the synthesizer device into a vacant ROM socket in the computer system.

Most Powerful implementation

In its most powerful implementation, the invention is positioned between the CPU and a significant part or all of the computer system's memory. It intercepts the data bus and the control bus between the CPU and the memory and I/O portions of the computer system. This implementation permits the synthesizer not only to supply instructions to the CPU for execution as a substitute for instructions stored in the system's RAM by the program in control of the system at the moment, but it can also make other valuable use of the memory space to which it has controlling access.

By way of demonstration and not limitation, some of these other uses to which the system memory may be put by the synthesizer could include some or all of the following:

- RAM data which results from an instruction access could be written to a selected location in the synthesizer's optional auxiliary internal memory;
- This data could be compared to the contents of a selected location in the synthesizer's optional auxiliary internal memory;
- An arithmetic or combinatorial logic operation could be performed between the data obtained by the instruction access and the contents of a specified location in the synthesizer's internal memory, and the result written back into either this auxiliary internal memory or to the system's memory.

In this most powerful implementation of the invention, the synthesizer could perform a very complex memory search or string arithmetic operation without any necessity for intervention by the CPU. In this case, the synthesizer merely furnishes JUMP and NOP instructions to the CPU for execution and uses the logic in its sequence controller and internal data processing array to carry out compare, counting or other similar repetitive operations.

String Search Example

An operation which pervades computer applications, occurs repeatedly, and often takes an inconveniently long times to complete, is searching a large memory for a string of characters or bytes that match a given string. Use of the present invention to accomplish such searches can significantly improve performance of even the most complex microprocessor now available, by eliminating a significant number of instructions that would have to be executed for each comparison operation without the present invention.

In a string search operation the full intercept embodiment of the synthesizer would include a Data Processing Array capable of storing and comparing the target string against the contents of the memory to be searched.

The process begins when the program being executed by the CPU calls the synthesizer for the purpose of assisting the CPU in performing a string search. After passing parameters to the synthesizer to define the length of the string to be found, the area of memory to be searched, and the contents of the target string, the synthesizer takes control of the buses and begins the search by providing the CPU with instructions. In some cases the most efficient design starts the search before collecting the entire target string, because the second element of the target string will not be required until there is a match found in the search area for the first element.

Although some of the instructions provided to the CPU may cause it to perform data processing operations, most such instructions simply cause the CPU to produce addresses to the memory in the required sequence. The synthesizer performs all calculations needed to produce these instructions in its internal hardware. The speed of such hardware operations is far in excess of the instruction execution time even without resort to expensive high speed logic devices. The synthesizer also performs the comparisons of the target string to strings found in memory, in direct support of the objectives of the calling program.

The Synthesizer supplies a sequence of instructions that cause the data from the area of memory being searched to appear on the data bus where they are accessible to the synthesizer where the comparison operation is performed internally. The result of this comparison operation is used by the peripheral to select both its next internal operation and the next instructions to be provided to the CPU. When the string search operation is completed, the synthesizer provides instructions which set flags in the CPU to indicate whether the search was successful, and if so, to store the address of the matched string in a CPU register before issuing a RETURN instruction to return control to the calling program.

Because the addresses to be searched are often sequential the instructions provided to the CPU use the program counter in the CPU as an address pointer into the memory. In the case of a discontinuous search such as a search for a record containing a specified field, the synthesizer provides NOP and JUMP instructions to cause the program counter to quickly address the discontinuous search area. Very little logic is required to synthesize the addresses for such a search. Since the comparison operation is being performed by logic in the peripheral device, very little additional logic would be required to mask this comparison operation to select for example only ASCII codes.

As an optional enhancement to this most powerful implementation of the invention, it may be desirable to equip the synthesizer with the ability to invert addresses from the CPU to the memory, thereby permitting the scanning of the system memory in the reverse direction. This is often desirable in the case of string arithmetic operations where the data is stored in memory with the most significant or highest value stored in the lowest memory location, as is often the case with sorted memory files of data in ASCII format.

Physical Embodiments

Having discussed the main functional embodiments of the invention, we turn now to the possible physical embodiments of the synthesizer. Any of the following, among many others which could be pointed out, may be used to implement the synthesizer in a particular situation.

CPU Socket PC Board

A plug-in printed circuit (PC) board could be designed with two sockets, one for the original CPU and one for the synthesizer. This board would then plug into the socket from which the original CPU is removed.

Add-In Memory Board

This PC board would appear to the CPU as additional memory while providing high-speed data management operations for any program written to take advantage of the synthesizer's presence in the system. This could, for example, take the form of an enhancement to an existing add-in memory board, designed to allow the synthesizer control accesses to the added block of memory. Optionally, this board could also contain an additional CPU. Several of these boards could be installed in one computer system.

CPU Integrated Circuit Enhancement

In this embodiment, the synthesizer would be physically integrated into the CPU device. The resulting CPU would be capable of executing any program written for the type of CPU involved except one which directed an instruction fetch to the memory location specified by the CPU as indicating activation of the synthesizer. This is the most potentially powerful of the physical embodiments.

Although the present invention has been described in terms of the presently known and preferred embodiments, it is to be understood that such disclosure is intended to be explanatory and not to be limiting. Various alterations and modifications of these embodiments will no doubt become apparent to those skilled in the art after having read this disclosure. Accordingly, it is intended that the appended claims be interpreted as covering all alterations and modifications which fall within the true spirit and scope of the invention.

What is claimed is:

1. An adaptive instruction generator for use in a computer system having a central processing unit (CPU), random access memory (RAM), a system bus including an address bus, data bus and control bus, all coupled to said instruction generator, comprising:

a startup decoder coupled to said system bus, said startup decoder generating a startup signal when a predefined startup signal pattern is detected;

state means for denoting the current state of said adaptive instruction generator;

data processing means, coupled to said data bus, for generating one or more synthesized data values, including means for generating data values corresponding to data received from said data bus;

state updating means for responding to said startup signal by causing said state means to denote an active state, and for generating a new current state in accordance with the previous current state and said synthesized data values;

instruction generating means responsive to memory access signals from said CPU on said control bus when said state means denote an active state, for generating and transmitting onto said data bus instructions to be used by said CPU, including means for generating instructions corresponding to said current state of said adaptive instruction generator and said synthesized data values generated by said data processing means; and deactivation means for deactivating said instruction generation means when said state means denotes a preseelcted inactive state;

whereby said adaptive instruction generator can perform data processing operations that would otherwise be performed by said CPU, and produce instructions for execution by said CPU based on the results of said data processing operations, thereby reducing the number of instructions executed by said CPU to perform a predefined task.

2. The adaptive instruction generator set forth in claim 1, wherein said instruction generating means, in response to a sequence of memory access signals from said CPU, generates a sequence of instructions for execution by said CPU.

3. The adaptive instruction generator set forth in claim 1, wherein said instruction generating means includes memory means for storing a multiplicity of instructions, and means for transmitting a sequence of said stored instructions onto said data bus in response to a sequence of memory access signals from said CPU.

4. The adaptive instruction generator set forth in claim 3, wherein said data processing means includes means for generating data values in accordance with said current state of said adaptive instruction generator.

5. The adaptive instruction generator set forth in claim 1, wherein said CPU includes a program counter for addressing the next CPU instruction to be fetched from said RAM;

said adaptive instruction generator occupies a predefined portion of the address space of said computer system; and said instruction generating means includes means for generating instructions which cause said CPU's program counter to maintain a value within said predefined address space portion until said state means denotes an inactive state.

6. The adaptive instruction generator set forth in claim 5, wherein said instruction generating means includes means for generating instructions which cause said CPU's program counter to address data in said RAM for use by said data processing means;

whereby said adaptive instruction means can use parameters stored in said RAM to determine what instructions to generate for said CPU.

7. The adaptive instruction generator set forth in claim 5, further including software stored in said RAM for initiating the use of said adaptive instruction generator including instructions for storing one or more parameters for defining a process to be performed by said CPU under the control of said adaptive instruction generator, and one or more subsequent instructions for activating said instruction generator by generating said startup signal pattern.

8. The adaptive instruction generator set forth in claim 5, wherein said CPU has a data bus port;

said adaptive instruction generator includes a data bus interface coupled to said CPU data bus port, to said data bus, to said data processing means and to said instruction generation means;

said data bus interface includes means for selectively transmitting to said CPU data bus port: data from said data bus, data values generated by said data processing means, and instructions generated by said instruction generation means;

whereby said adaptive instruction generator can control both the data and the instructions used by said CPU.

9. A method of adaptively generating instructions for use in a compute system having a central processing unit (CPU), random access memory (RAM), address bus, data bus and control bus, the steps of the method comprising:

detecting a predefined startup signal pattern on at least one of said address, data and control busses, and then generating a state signal having a value indicating that said predefined startup signal pattern has been detected;

performing, in response to memory access signals from said CPU on said control bus, the following repeating sequence of instruction generating steps:

synthesizing one or more data values in accordance with the value of said state signal and the data on said data bus;

generating and transmitting onto said data bus instructions to be used by said CPU, including the step of generating instructions corresponding to said current value of said state signal and said synthesized data values; and generating a new state signal value in accordance with the previous value of said state signal and said synthesized data values; and stopping said sequence of instruction generating steps when said state signal value denotes a preselected inactive state;

whereby data processing operations that would otherwise be performed by said CPU are eliminated by producing instructions for execution by said CPU based on the results of said synthesizing step, thereby reducing the number of instructions executed by said CPU to perform a predefined task.

10. The method set forth in claim 9, wherein
said CPU includes a program counter for addressing the next CPU instruction to be fetched from said RAM;
a predefined portion of the address space of said computer system is reserved for said sequence of instruction generating steps; and
said method includes generating instructions which cause said CPU's program counter to maintain a value within said predefined address space portion until said stopping step is performed.

11. The method set forth in claim 10, wherein
said method includes generating instructions which cause said CPU's program counter to address data in said RAM for use in synthesizing step;
whereby said method can use parameters stored in said RAM to determine what instructions to generate for said CPU.

12. The method set forth in claim 10, wherein
said method includes storing software in said RAM for initiating the performance said instruction generating steps, said stored software including instructions for storing one or more parameters for defining a process to be performed by said CPU under the control of said method of adaptively generating instructions, and one or more subsequent instructions for generating said startup signal pattern.

13. The method set forth in claim 10, wherein
said CPU has a data bus port; and
said method further includes the step of selectively transmitting to said CPU data bus port: data from said data bus, data values generated by said synthesizing step, and instructions generated by said instruction generating step;
whereby said method can control both the data and the instructions used by said CPU.

* * * * *